United States Patent Office 3,515,223
Patented June 2, 1970

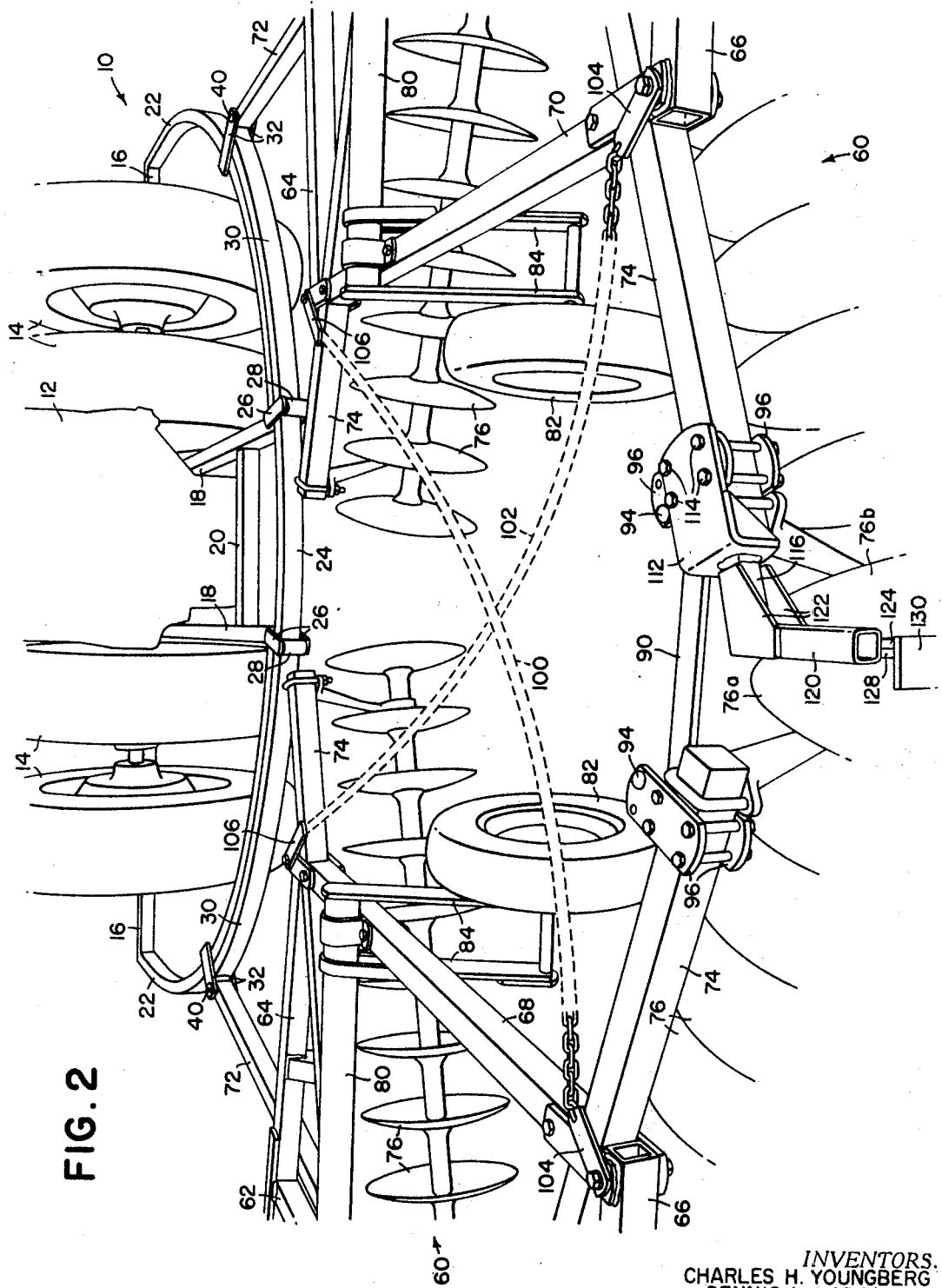

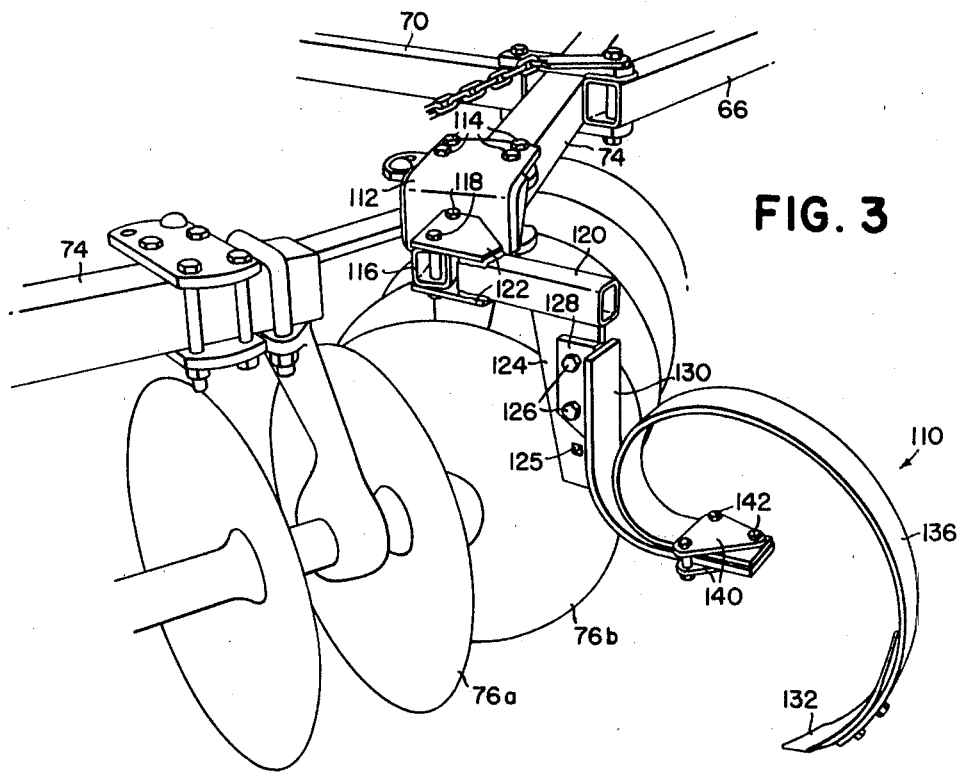
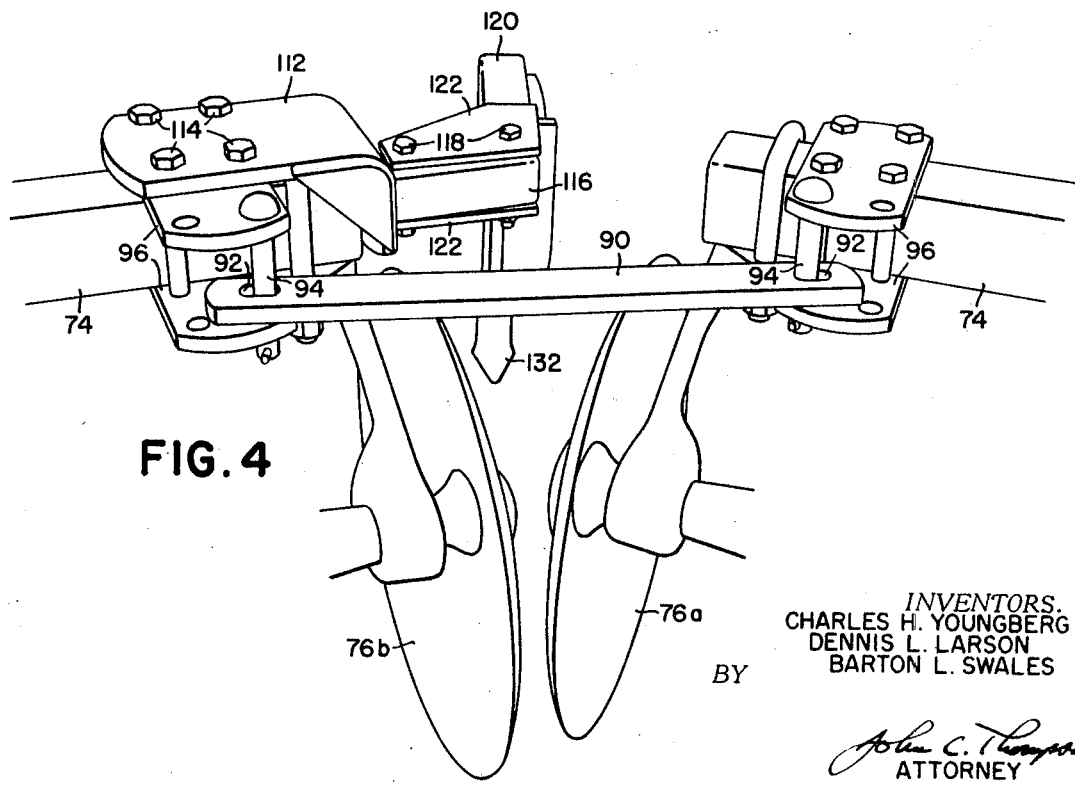

3,515,223
HITCH CONSTRUCTION FOR TWO TANDEM
DISK HARROWS
Charles Harold Youngberg and Dennis Luverne Larson,
Moline, and Barton Lee Swales, Silvis, Ill., assignors
to Deere & Company, Moline, Ill., a corporation of
Delaware
Filed Apr. 8, 1968, Ser. No. 719,563
Int. Cl. A01b 23/04, 39/28
U.S. Cl. 172—658                                    6 Claims

ABSTRACT OF THE DISCLOSURE

Two tandem disk harrows are secured to spaced apart points on a hitch device which is in turn mounted to a tractor. The inner ends of the rear gangs are connected to each other by a rigid link to prevent interference between gangs. Crossed chains interconnect the harrows to maintain proper spacing of the forward gangs. A rear ground-working device works the ground between the two harrows.

FIELD OF THE INVENTION

The present invention relates generally to agricultural implements and more particularly to a hitch construction for securing two tandem disk harrows to a tractor. More particularly, this invention relates to structure for interconnecting two tandem disk harrows when the harrows are connected to spaced apart portions of a hitch to which two implements may be secured.

Cross reference to related application

This application discloses in part a hitch device more fully disclosed in copending application Ser. No. 707,695 filed Feb. 23, 1968.

DESCRIPTION OF THE PRIOR ART

Until recently, it has been common practice to design tandem disk harrows to match the horsepower of a tractor. Thus, if a harrow is to be used with a tractor having 70 available horsepower at the drawbar, a disk harrow of a prescribed width is designed. However, as the horsepower of tractors has been increasing in recent years, the width of the harrows has also increased until now it is extremely difficult to transport the harrows from one field to another over highways. Thus, it is desirable to secure two harrows to a tractor of larger horsepower so that the harrows may be more easily transported from field to field. In the past, various hitch designs have been proposed for two tandem disk harrows, some of these being shown in the Stueland Pat. 2,709,085, issued May 24, 1955, the Scheibner Pat. 2,716,854 issued Sept. 6, 1955 and the Bartel Pats. 2,971,774, issued Feb. 14, 1961 and 3,112,124, isued Nov. 26, 1963. While these hitches have been generally satisfactory, it has been found that in certain conditions the performance of the harrows is unsatisfactory for the reason that one harrow may interfere with another harrow since the only connection between the two harrows is at the forward end of the draft frame of each of the harrows.

Another form of hitch device to which two tandem disk harrows may be secured is shown in Oehler et al. Pat. 3,079,174 issued Feb. 26, 1963. When harrows are connected to the form of hitch shown in this patent, it has been customary to provide a brace between the rear gangs of the harrow to prevent the gang of one harrow from interfering with the adjacent gang of the other harrow. These braces have not been satisfactory since if they are rigid with the harrows they tend to bend due to the high draft loads imposed upon the harrows, or if they are provided for pivotal movement one harrow tends to track in front of the other and thus the ground is not properly prepared.

It has also been found that when using harrows of these prior art devices that the ground between the two tandem disk harrows is not properly tilled.

SUMMARY OF THE INVENTION

It is an object of the present invention to provide a hitch construction for two tandem disk harrows which overcomes the disadvantages of the prior art.

More particularly, it is an object of the present invention to provide a construction to maintain the proper spacing and alignment of two tandem disk harrows when the hitch bars of the disk harrows are secured to two spaced apart points on an implement hitch.

It is a further object of the present invention to provide ground-working means securable to one of two disk harrows when hitched to two spaced apart points of an implement hitch, the ground-working device being operable to properly work the soil between the harrows.

A still further object of the present invention is to provide means for interconnecting two harrows to maintain them in their proper working conditions when hitched to a common implement hitch, the interconnecting means being of high durability and low cost.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 2 is a perspective view of a portion of the assembly shown in FIG. 1, showing in more detail how the disk harrows are interconnected.

FIG. 3 is a perspective view of the earth-working implement which is secured to one of the disk harrows to work the soil between the harrows.

FIG. 4 is a perspective view illustrating the manner in which the rear gangs of the disk harrows are interconnected.

DESCRIPTION OF THE PREFERRED EMBODIMENTS

Figure 1:
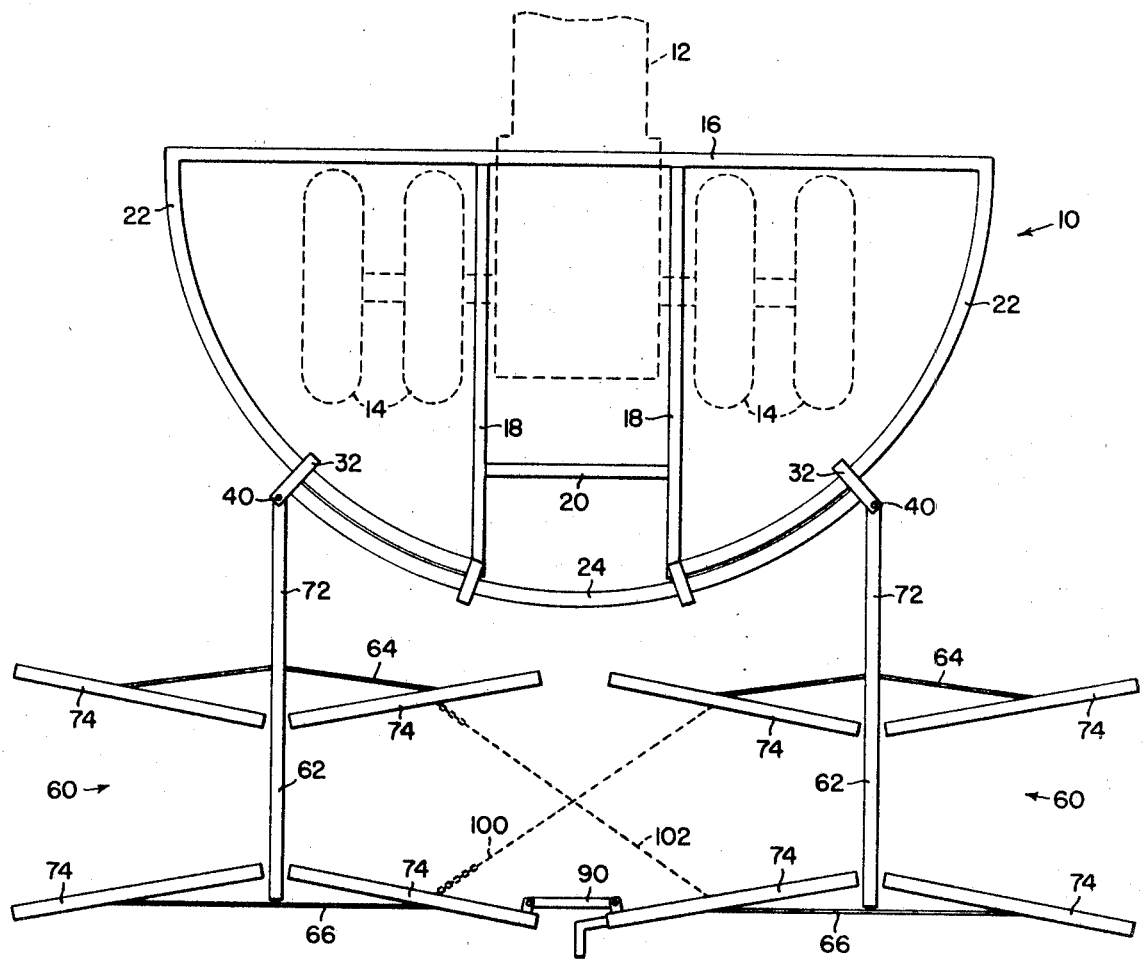
FIG. 1 is a diagrammatic plan view showing the manner in which two tandem disk harrows are secured to a common implement hitch which is in turn mounted on a tractor, the harrows being interconnected to maintain their proper working positions and also being provided with additional earth-working structure to properly till the soil between the harrows.

In the following description right-hand and left-hand reference is determined by standing to the rear of the tandem disk harrows and facing the direction of travel.

Referring first to FIG. 1, a hitch device indicated generally at 10 is shown secured to a tractor 12 (shown in phantom), the tractor having spaced apart rear duel drive wheels 14. The hitch device, which is the subject of copending application Ser. No. 707,695 filed Feb. 23, 1968, includes a forward transverse frame member 16 which is rigidly secured to the belly of a tractor, longitudinally extending frame members 18, the forward ends of which are secured to the transverse frame member 16, and which are braced to each other by a transverse brace 20, and arcuate side members 22 which are secured at their forward ends to the frame member 16 and at their rear ends to the rear end of the frame members 18. The brace 20 supports the rear portion of the hitch 10 and to this end is secured the tractor drawbar. An arcuate member 24 is carried by the arcuate member 22 and is supported for rolling movement about the frames 22. The midportion of the member 24 is normally supported by upper and lower spaced apart rollers (not shown) mounted adjacent upper and lower straps 26 which are in turn secured to the rear ends of members 18. A rear roller 28 is carried by each pair of straps 26 and bears against the rear side of the arcuate member 24. Each of the forward ends 30 of the arcuate member 24 is secured to upper and lower spaced apart plates 32. The plates 32 in turn carry rollers (not shown) which bear against the forward, upper, and lower surfaces of the arcuate side members 22.

A hitch pin 40 passes through the spaced apart plates 32 and is adapted to secure the forward end of an implement drawbar to ends 30 of the arcuate member 24. For further details of the hitch 10, see applicant's copending application Ser. No. 707,695 filed Feb. 23, 1968.

Secured to the spaced apart hitch pins 40 are two tandem disk harrows 60 of conventional construction. Each harrow includes a longitudinally extending main frame member 62 which is secured at its forward end to a transversely extending frame member 64. The rear end of the longitudinally extending main frame member 62 is secured to a rear transverse frame member 66. Right and left longitudinally extending frame members 68, 70, respectively, are secured to the outer ends of the frame members 64 and 66. A forwardly extending tongue 72 is secured to the longitudinally extending main frame member 62 and its forward end is secured to the hitch pin 40.

Each harrow includes front and rear disk gangs, each disk gang including a principal frame member 74 to which a plurality of disks 76 are secured.

The disk harrows may be raised and lowered between transport and working positions by a hydraulically actuated rockshaft 80 which rotatably carries wheels 82 on rock arms 84.

To prevent one disk gang from interfering with another during operation, a transversely extending brace member 90 is provided. The brace member, which is best shown in FIG. 4, consists essentially of rectangular bar stock having enlarged apertures 92 at each end. A pin 94, which is carried by upper and lower plates 96 bolted or otherwise secured to the frame 74, is passed through each of the apertures 92. It should be obvious that if the adjacent rear disks 76a, 76b were to move towards each other that the strap 90 would cause one harrow to move forwardly, rearwardly, upwardly, or downwardly with respect to the other one so that one disk 76a would not interfere with the other disk 76b.

To permit movement of one harrow with respect to the other but to prevent one harrow from advancing materially beyond the other, a pair of crossed chains 100, 102 are provided. The rear end of each chain is secured to a strap 104, the strap in turn being secured to the point of interconnection of the rear frame memer 66 with the side members 68, 70 adjacent the other disk harrow. The forward ends of the chains 100, 102 are secured to a plate member 106 which is in turn secured to the point of interconnection of the forward frame member 64 with one of the side members 68, 70. As shown in FIG. 2, the chains 100, 102 are mounted in slight catenary fashion such that each is provided with a limited amount of slack. It can be seen best in FIGS. 1 and 2 that if the right-hand disk harrow should tend to move ahead of the left-hand disk harrow, that the chain 100 will, after very limited movement, prevent further movement of the right-hand harrow with respect to the left-hand harrow. Similarly, if the left-hand harrow tended to move ahead of the right-hand harrow, the chain 102 would prevent movement after a limited amount. Thus the chains 100, 102 maintain the right- and left-hand tandem disk harrows in transverse alignment.

To insure that the ground is worked properly between the right- and left-hand tandem disk harrows, an earthworking tool 110 (FIG. 3) is provided. This tool is secured to one of the frame members 74, and to this end an L-shaped support structure 112 is provided, the long leg of the member 112 overlying the frame 74 and being secured thereto by bolts 114 which are also employed to secure the upper and lower plates 96 to the frame member 74. The short leg of the L-shaped member is provided with an outwardly extending tubular member 116 having vertically extending transversely spaced apart apertures through which securing bolts 118 may be disposed.

Another tubular member 120 is provided, the forward end of this tubular member 120 carrying upper and lower gusset plates 122 which are provided with two pairs of aligned apertures adapted to receive the bolts 118, one pair of aligned apertures being slightly enlarged so that the member 120 can be angularly adjusted so that the tool 110 can be transversely adjusted to dispose it in the proper position to engage the unworked ground between the disks 76a and 76b. A support member 124 is welded to the underside of the tubular member 120 and extends downwardly therefrom, the support member being provided with a plurality of vertically spaced apart apertures 125. A pair of fastening bolts 126 are disposed within a pair of apertures 125 and secure a flange 128 on the tool support bracket 130 to the support member 124. The tool 110 may be adjusted vertically by positioning the bolts 126 in an upper or lower set of apertures. The tool 110 preferably includes a cultivator 132 which is carried by a spring shank 136 which is in turn secured to the support bracket 130 by upper and lower plate members 140 which are bolted about the support bracket 130 by bolts 142, one of the bolts 142 passing through an aperture in the support bracket 130.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In combination with a hitch device having two spaced apart hitching means; a pair of transversely aligned implements, each having a forwardly extending tongue secured to one of said pair of hitching means; a transversely extending rigid brace extending between and universally connected at its respective ends to rear portions of the implements; and a pair of crossed chains extending in slightly catenary fashion between the implements and operable to restrain the implements from moving out of general transverse alignment with one another, one of said chains being connected at one end to a forward portion of one of the implements and at the other end to a rear portion of the other of said implements, and the other chain being connected at one end to a forward portion of said other implement and at the rear end to a rear portion of said one implement.

2. In combination, a hitch device for connecting a pair of transversely aligned tandem disk harrows to a tractor, said hitch device having a frame carried by the tractor, first and second curved members mounted on the frame and arcuate about a point located forward of the rear portion of the tractor, a third member mounted on said first and second members and shiftable relative thereto about said point, and an implement mounting bracket on each end of said third member; a pair of tandem disk harrows, each of said harrows having a forwardly extending tongue secured to one of said mounting brackets, a forward pair of disk gang frames and a rear pair of disk gang frames; a transversely extending rigid brace extending between and universally connected at its respective ends to the rear disk gang frames; and a pair of crossed chains extending in slight catenary fashion between the implements and operable to restrain the disk harrows from moving out of general transverse alignment with one another, one of said chains being connected at one end to a front disk gang frame of one of the harrows and at the other end to a rear disk gang frame of the other harrow, the other chain being connected at one end to a front disk gang frame of said other harrow and at the other end to the rear gang frame of said one of the harrows.

3. The combination set forth in claim 2 in which said transversely extending brace includes a rigid member apertured at both ends, vertically extending pin means disposed within each of said apertures, and means operable to fixedly secure said pin means to said rear disk gang frames.

4. The combination set forth in claim 2 in which additional ground-working means are provided to till the soil between the harrows, said ground-working means including a cultivator mounted on one of the rear disk gang frames and extending towards the other of said rear disk gang frames.

5. The combination set forth in claim 4 in which said cultivator is vertically and transversely adjustable.

6. In combination, a hitch device for connecting a pair of transversely aligned implements to a tractor, said hitch device having a frame carried by the tractor, first and second curved members mounted on the frame and arcuate about a point located forward of the rear portion of the tractor, a third member mounted on said first and second members and shiftable relative thereto about said point, and an implement mounting bracket on each end of said third member; a pair of transversely aligned implements, each having a forwardly extending tongue secured to one of said mounting brackets; a transversely extending rigid brace extending between and universally connected at its respective ends to rear portions of the implements; and a pair of crossed chains extending in slight catenary fashion between the implements and operable to restrain the implements from moving out of general transverse alignment with one another, one of said chains being connected at one end to a forward portion of one of the implements and at the other end to a rear portion of the other of said implements, and the other chain being connected at one end to a forward portion of said other implement and at the rear end to a rear portion of said one implement.

References Cited

UNITED STATES PATENTS

| 267,294 | 11/1882 | Wheeler | 172—627 |
| 357,254 | 2/1887 | Waughtal | 172—627 |
| 787,011 | 4/1905 | Tower | 172—627 X |
| 1,428,543 | 9/1922 | Gallagher | 172—658 X |
| 1,561,849 | 11/1925 | Gregg | 172—310 X |
| 1,613,079 | 1/1927 | Brink | 172—658 |
| 1,827,920 | 10/1931 | Wardley | 172—624 X |
| 2,182,260 | 12/1939 | Kovar | 172—624 X |
| 2,617,342 | 11/1952 | Meissner | 172—579 X |
| 2,709,085 | 5/1955 | Stueland | 280—412 |
| 2,755,613 | 7/1956 | Oehler et al. | 172—579 X |

FOREIGN PATENTS 100,462 9/1873 France.

ROBERT E. PULFREY, Primary Examiner

A. E. KOPECKI, Assistant Examiner

U.S. Cl. X.R.

172—310